April 1, 1941.  F. C. HOLTZ  2,237,142

WATTHOUR METER CONSTRUCTION

Filed Dec. 15, 1938

Inventor:
Frederick C. Holtz.
By [signature]
Attys.

Patented Apr. 1, 1941

2,237,142

UNITED STATES PATENT OFFICE 2,237,142

WATTHOUR METER CONSTRUCTION

Frederick C. Holtz, Springfield, Ill., assignor to Sangamo Electric Company, Springfield, Ill., a corporation of Illinois Application December 15, 1938, Serial No. 245,832

2 Claims. (Cl. 171—264)

My invention relates generally to induction type electrical instruments, such as watthour meters, and it has particular relation to the arrangement and construction of damping permanent magnets thereof.

The object of my invention, generally stated, is to provide an improved form of permanent magnet construction for induction type electric instruments that shall be compact and at the same time powerful.

An object of my invention is to increase the damping effect of a permanent magnet on the disc of an induction type electric instrument for a given amount of magnet material.

Another object of my invention is to so arrange the poles of a permanent magnet acting as a damper on the disc of an induction type electric instrument as to cause an increased damping action due to increased interaction between the eddy currents in the disc and the fluxes of the poles.

Other objects of my invention will in part be obvious and in part appear hereinafter.

Accordingly, my invention is disclosed in the embodiments thereof shown in the accompanying drawing, and it comprises the features of construction, combinations of elements, and arrangement of parts which will be exemplified in the constructions hereinafter set forth and the scope of the application of which will be indicated in the appended claims.

For a more complete understanding of the nature and scope of my invention reference may be had to the following detailed description taken in connection with the accompanying drawing, in which.

Figure 1:
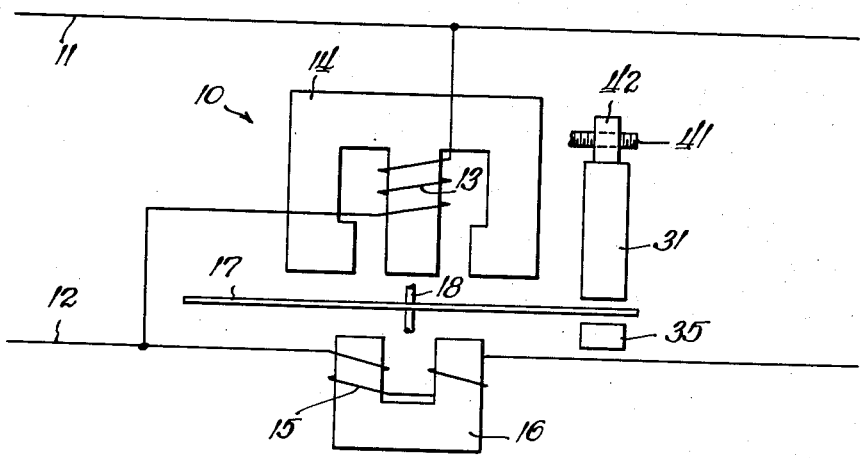
Figure 1 illustrates diagrammatically the typical circuit connections and arrangement of parts of an induction type electric instrument such as a watthour meter with which one embodiment of my invention is combined.

Referring first to Figure 1 of the drawing, it will be noted that the reference character 10 designates generally an induction type electric instrument such as a watthour meter which is connected to measure the power or energy in a circuit comprising conductors 11 and 12. While the conductors 11 and 12 are connected to a suitable source of single phase alternating current, it will, of course, be understood that the invention may be employed in connection with an electric instrument connected to a polyphase circuit.

The instrument 10 is provided with a voltage winding 13 which is connected between the conductors 11 and 12, and which is positioned on the central leg of a core 14 of an electro-magnet. A current winding 15 is connected in series circuit relation with the conductor 12 and is positioned on a core 16 of the electro-magnet. The interaction of the fluxes generated by the voltage and current windings 13 and 15 causes rotation of a disc 17 of conducting material in the well known manner. The disc 17 is mounted for rotation with a shaft 18 at its center which is arranged to drive a suitable gear train for operating a register in the usual manner.

Figure 2:
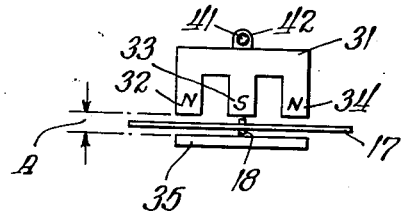
Figure 2 is a view in side elevation of the permanent magnet construction shown in Figure 1, the remaining parts there shown being omitted.

In Figures 1 and 2 of the drawing I have illustrated a form of permanent magnet construction at 31 which, for a given amount of magnet material, is capable of producing a greater retarding torque in the disc 17 than is provided by the same amount of material in a horseshoe magnet construction for example. The permanent magnet 31 is of a generally E-shaped configuration with poles 32, 33 and 34 extending toward the disc 17. As indicated, the poles 32 and 34 may be north poles while the pole 33 is a south pole. A soft iron magnetic return piece 35 is provided on the opposite side of the disc 17 in order to provide a low reluctance return path for the magnetic flux.

Figure 3:
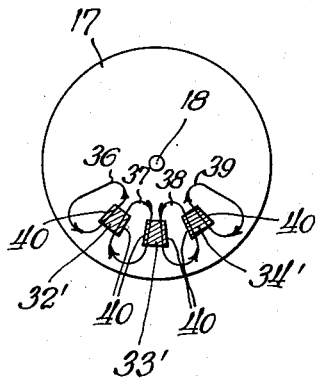
Figure 3 is a view partly in plan and partly in section illustrating a pole arrangement modified somewhat from that shown in Figure 2.

The poles 32, 33 and 34 may be arranged in a single plane, or as illustrated at 32', 33' and 34' in Figure 3 they may be arranged along a circle and equidistant from the center of the disc 17. In either case eddy currents will be caused to flow in the disc 17 that may be generally represented by the full lines 36, 37, 38 and 39. Now, it will be observed that the eddy currents represented by the line 37 interact with flux from poles 32 and 33 or 32' and 33', while the eddy currents represented by the line 38 interact with the flux from the poles 33 and 34 or 33' and 34'.

It is of course necessary to space the poles 32, 33 and 34, or 32', 33' and 34', sufficiently close together so that the eddy currents generated under one pole will flow in a path which passes underneath another pole. In other words, the poles should not be located so far apart that the eddy currents generated under one of them will not interlink the flux of one or more of the other poles.

As illustrated in Figure 3 of the drawing, the sides 40 of the poles 32', 33' and 34' are radial with respect to the center of the disc 17.

With a view to varying the retarding torque applied to the disc 17 an adjusting screw 41 may be provided, as shown in Figure 1, for cooperating with an ear 42 carried by the permanent magnet 31. Additionally, by varying the air gap A between the permanent magnet 31 and the soft iron magnetic return piece 35 the retarding torque can also be varied.

Figure 4:
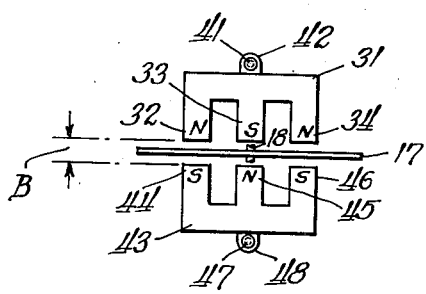
Figure 4 is a view of still another modified form of permanent magnet construction.

Instead of employing the magnetic return piece 35 as shown in Figures 1 and 2, another permanent magnet 43 may be provided on the opposite side of the disc 17 as illustrated in Figure 4. The permanent magnet 43 is of generally E-shape with poles 44, 45 and 46 extending toward the disc 17. These poles are positioned opposite the poles 32, 33 and 34 of the permanent magnet 31, and, as shown, they are of opposite polarity. It will be apparent that the poles 44, 45 and 46 can be positioned in a common plane which is also common to the poles 32, 33 and 34, or that they may be positioned in a circular manner as illustrated in Figure 3.

The position of the permanent magnet 43 with respect to the center of the disc 17 may be varied by an adjusting screw 47 which cooperates with an ear 48 carried by the magnet 43. Additionally, the air gap B between the permanent magnets 31 and 43 may be adjusted to vary the retarding torque.

While the permanent magnets 31 and 43 have been illustrated as each having three poles and each being generally E-shaped, it will be understood that even a greater retarding torque may be applied to the disc 17 if a larger number of poles are employed. However, for practical purposes it appears that there is a sufficient increase in retarding torque when the E-shaped construction is employed over that which is provided when a horse-shoe shape is employed, as to render generally unwarranted the use of more than three poles. It will be understood, however, that the use of three or more poles as described hereinbefore and shown in the drawing is within the spirit and scope of the present invention.

Since certain further changes may be made in the foregoing constructions and different embodiments of the invention may be made without departing from the scope thereof, it is intended that all matter shown in the accompanying drawing or described hereinbefore shall be interpreted as illustrative and not in a limiting sense.

I claim as my invention:

1. In an induction type electric instrument, in combination, a rotatable disc of conducting material, means for rotating said disc, and a generally E-shaped one piece permanent magnet positioned on one side of said disc, the poles of said E-shaped magnet being substantially equidistant from the center of said disc and so spaced relative to each other that there is substantial interaction between the eddy currents generated in said disc under one pole and the flux of the adjacent pole or poles.

2. In an induction type electric instrument, in combination, a rotatable disc of conducting material, means for rotating said disc, a generally E-shaped one piece permanent magnet positioned on one side of said disc, the poles of said E-shaped magnet being substantially equidistant from the center of said disc with the sides being substantially radial with respect to the center of said disc and so spaced relative to each other that there is substantial interaction between the eddy currents generated in said disc under one pole and the flux of the adjacent pole or poles, and an additional E-shaped one piece permanent magnet positioned on the opposite side of said disc, and cooperating therewith, the poles of said additional E-shaped permanent magnet being of substantially the same shape and in substantially the same relative position as the poles of said first mentioned permanent magnet but having opposite polarities.

FREDERICK C. HOLTZ.